United States Patent [19]
Murakami et al.

[11] Patent Number: 5,761,404
[45] Date of Patent: Jun. 2, 1998

[54] IMAGE-DATA MANAGING APPARATUS

[75] Inventors: Tatsuya Murakami, Odawara; Yasuo Kurosu, Yokosuka; Kenichi Nishikawa, Odawara; Eiichi Sato, Hiratsuka; Jun Nishiyama, Odawara, all of Japan

[73] Assignee: Hitachi, Ltd., Tokyo, Japan

[21] Appl. No.: 715,702

[22] Filed: Sep. 19, 1996

[30] Foreign Application Priority Data

Sep. 20, 1995 [JP] Japan ................. 7-241860

[51] Int. Cl.⁶ .................................. G06F 11/00
[52] U.S. Cl. ..................... 395/182.13; 395/185.04
[58] Field of Search .................. 395/182.13, 618, 395/488, 620, 185.04, 849, 200.33, 200.53; 364/944.3, 971

[56] References Cited

U.S. PATENT DOCUMENTS

| | | | |
|---|---|---|---|
| 4,752,910 | 6/1988 | Yen et al. | 364/900 |
| 5,161,214 | 11/1992 | Addink et al. | 395/145 |
| 5,247,664 | 9/1993 | Thompson et al. | 395/182.13 |
| 5,535,322 | 7/1996 | Hecht | 395/155 |
| 5,581,691 | 12/1996 | Hsu et al. | 395/182.13 |
| 5,594,863 | 1/1997 | Stiles | 395/182.13 |

FOREIGN PATENT DOCUMENTS 5-258029  10/1993  Japan ................. 395/185.04

Primary Examiner—Robert W. Beausoliel, Jr.
Assistant Examiner—Scott T. Baderman
Attorney, Agent, or Firm—Fay, Sharpe, Beall, Fagan, Minnich & McKee

[57] ABSTRACT

In an image-data managing apparatus for a work-flow system, wherein image data transmitted from a server are updated sequentially by a plurality of clients, a temporary storage for temporarily storing data being updated is provided in each client, and an image database, an image-data storage device, a work-flow managing unit, and a recovery-state managing unit are provided in the server. When a failure occurs in the image-data managing apparatus and the recovery of image data is requested, the recovery-state managing unit extracts control information from the work-flow managing unit, which control information indicates whether or not image data are preserved in the temporary storage or the image-data storage device in the course of update processing, thereby executing a function for identifying image data to be retrieved

4 Claims, 7 Drawing Sheets

| # | DOCUMENT-NAME COLUMN | USER-IN-CHARGE COLUMN | PREVIOUS-STAGE-USER-IN-CHARGE COLUMN | STATUS COLUMN | ATTRIBUTE COLUMN | PREVIOUS-STAGE-ATTRIBUTE COLUMN |
|---|---|---|---|---|---|---|
| | 310 | 320 | 330 | 340 | 350 | 355 |
| 1 | DOC_1 | FIN | USER_J | F | IMG/DOC1/Pr8 | IMG/DOC1/Pr7 |
| 2 | DOC_2 | USER_B | USER_A | N | IMG/DOC2/Pr1 | IMG/DOC2/Pr1 |
| 3 | DOC_3 | USER_D | USER_C | P | CID/DOC2/Pr4_1 | IMG/DOC2/Pr3 |
| ⋯ | ⋯⋯⋯⋯ | ⋯⋯⋯⋯ | ⋯⋯⋯⋯ | ⋯⋯⋯⋯ | ⋯⋯⋯⋯ | ⋯⋯⋯⋯ |

*FIG. 2*

| STATUS INFORMATION | COMPLETION STATE OF TEMPORARY STORING OF DATA BEING UPDATED | STATE OF LOCAL-FILE CONNECTION | FILE FOR RECOVERY |
|---|---|---|---|
| "N" INDICATING AN UNUPDATED STATE | — | — | RESULT IN THE SERVER OUTPUT BY THE PREVIOUS STAGE |
| "P" INDICATING A PROCESSED STATE | UPDATED INFORMATION NOT STORED YET | THE LOCAL FILE IS NOT ACCESSIBLE | |
| | UPDATED INFORMATION STORED ALREADY | THE LOCAL FILE IS ACCESSIBLE | LOCAL FILE |

*FIG. 7*

IMAGE-DATA MANAGING APPARATUS

BACKGROUND OF THE INVENTION

1. Field of the Invention

In general, the present invention relates to an image-data managing apparatus of a client-server system. In particular, the present invention relates to a data managing apparatus for protecting data being processed in the event of a system failure occurring during a system operation or in the event of a suspension of the system operation by the user. The data managing apparatus is used in a system that generally adopts a utilization technique whereby a plurality of users create image data of certain documents while displaying the image data being created sequentially, one user after another. A nonlimiting, illustrative example of a system of application is an electronic mail, or e-mail, system.

2. Description of the Related Art

The electronic filing system is a conventional system for storing a large amount of image data and transmitting the data upon receipt of a request made by a client through a LAN (Local Area Network). A representative example of such an electronic filing system is the Hit File-6500 manufactured by Hitachi, Ltd. Such a system employs a mass storage device, such as an optical disk, for storing images of documents or the like as binary data. The system searches the mass storage device for particular image data requested by a client, typically a personal computer, and transmits the image data through a network to the client making the request where the image data are to be displayed.

The main application of such a system is to store image data of documents such as drawings to be shared and referenced by a plurality of users, and to respond to requests made independently by the individual users.

In recent years, on the other hand, a system for handling documents such as work forms flowing among a plurality of users in charge of processing in an order determined in advance, wherein the users in charge of processing can carry out their jobs sequentially, has become popular. This system is known as a work-flow system. It is not a system that simply operates on a request-for-search/response basis. Instead, a flow of documents is defined in advance and the documents are cataloged as image data. The image data are transmitted through predefined users in charge of processing, one user after another, and the users in charge of processing correct the image data, or code data appended to the image data, or add data to them. In such a system, the image data or the code data appended to the image data are changed every time the data pass through a user.

In the case of the conventional electronic file system, image data are preserved as data which were originally cataloged in the system. If image data are changed, they must be cataloged as new image data. As a result, a failure occurring in the system can be recovered only if image data are preserved every time they are cataloged.

In the case of a work-flow system, on the other hand, additional data are an important part of the course or document processing. In addition, it is necessary to establish time matching of the data. This implies that positions recognized by the time flow must match the states of pictures and code data. These issues are not taken into consideration in the conventional electronic file system due to the fact that the system has applications which are different from each other.

In the case of a client/server system, a technique for treating failures occurring during the handling of image data is disclosed in Japanese Patent Publication No. Hei 5-258029, entitled "Image Processing Apparatus". According to this technique, a destination can be defined in each processing. In the event of a failure occurring in the course of a transfer of image data, a function provided by this technique is used for informing a destination, which is defined in advance, of the occurrence of the failure. In this system, however, protection of the data itself is not taken into consideration.

SUMMARY OF THE INVENTION

As described above, if the conventional technique is applied to the work-flow system, there is no effective means for protecting data in the process of the work flow. In addition, in spite of the fact that the user may suspend the processing while certain data are being updated or new data are being added, there is no means for temporarily saving data being processed under the control of the work-flowing system as it is. Accordingly, even if an attempt is made to protect data by, for example, using the already known technique of using a back-up file, the data are not stored in the back-up file in a form recognized by the work-flow system. As a result, the technique is not an effective means for protection.

The following problems are to be solved by the present invention:

(1) Added and modified data resulting from some processes carried out by the users after a cataloging process cannot be protected.

(2) Due to the fact that a supervisory DB (database) of the work flow, a picture DB, and a DB for search and control information and for code data are provided independently of each other, it is difficult to recover the matching of the contents of the DBs in the event of a failure occurring in the course of a flow.

(3) There is no means for storing ongoing processes of jobs carried out by the users in the system as a whole. Even if a process is stored locally at an individual user level at the client's site for data protection purposes, the stored process is removed from the flow and, thus, cannot be put to practical use. In addition, for the same reason as that of the problem (2), there is no effective means for making a judgment as to how a difference between data of the DBs and local data should be handled in the event of a failure occurring in the system as a whole.

In order to achieve the first object described above, the present invention provides the following means:

(1) Means for copying updated data in the server when data stored in the image database and data stored in the database for code information are updated at the time the user finishes processing;

(2) Means for storing data, which are being processed, temporarily in the client;

(3) Means for storing in the database an informational flag indicating that data being processed exist;

(4) Means for keeping records indicating clients in which temporary data files are temporarily recorded at every point of time, and means for reading out the records;

(5) Means for making a judgment as to whether copied data are to be read out from the server, which copied data have been recorded in the server at the end of the previous stage, or data are to be read out from a temporary saving file in a client for recording data being processed at a time a process to recover the data is requested; and (6) Means for storing updated data resulting from processing in the databases of the server at the time the user in charge of the processing finishes the processing, and for deleting all working data generated during the updating process in the server-client system, at the time the completion of the process of storing the updated data is verified.

The principle and operation of the present invention are explained as follows.

As a solution to the aforementioned problem (1), the present invention provides means for making a backup of image data flowing in the work flow in the course of processing. As a result, data in the work flow are recorded in the server and client for backup purposes in addition to the database which exists from the beginning.

In addition, in order to utilize these pieces of recorded data, it is necessary to keep track of information indicating which piece of data is recorded in which portion of the system and at what point of time.

According to the present invention, when data stored in the database of the server are updated at each step of the work flow or each time an individual user in charge of processing finishes the process, a copying process for backup purposes is also carried out at the same time, and data resulting from the copying process are stored in the server. On the client side, on the other hand, data being processed are stored moment by moment upon request by the user carrying out the process by utilizing the client or as driven by an event or the like which takes place with the lapse of time.

Now, it is necessary to synchronize the operation to update control information in order to preserve the matching between the data recovered from these files and other databases (in particular, the control information of the work flow). Therefore, by updating backup data on the server side when information on the work flow side is updated, or with the timing of data cataloging in the server or transferring data the next user in charge of processing after the completion of processing owned by an individual user on the work flow, at least, the matching between the backup data in the server and the work flow can be established.

On the other hand, by recording the existence of the data, which data are being updated and are to be recorded in a client, the data can be utilized in further implementation of a recovery with a small amount of loss at recovery time after the completion of processing determined by the user in charge of the processing.

In addition, the data are temporary. Accordingly, even if sufficient conditions for recovery do not exist in databases such as the database for controlling the work flow, the matching of the databases can be preserved by utilizing the backup data in the server and ignoring the data being updated.

BRIEF DESCRIPTION OF THE DRAWINGS

FIG. 2 is a diagram used for explaining items peculiar to the present invention included in a work flow control table;

FIG. 7 is a diagram used for explaining typical operations carried out by a recovery-state managing unit.

DETAILED DESCRIPTION OF THE PREFERRED EMBODIMENTS

Figure 1:
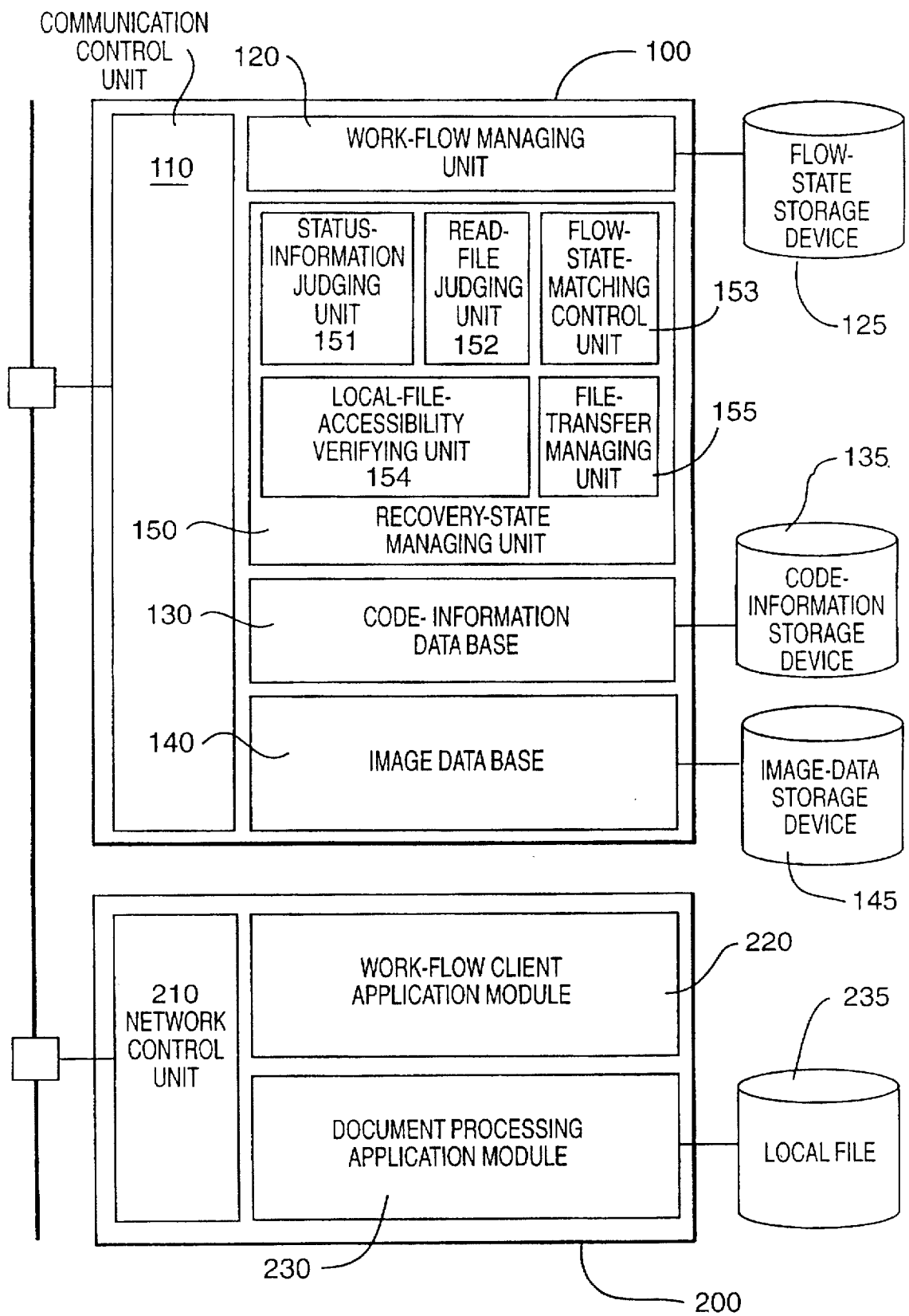
FIG. 1 is a diagram used for explaining a typical configuration of a system as a whole.

FIG. 1 is a diagram used for explaining the configuration of an embodiment constructed according to the teachings of the present invention. In order to simplify the description, the configuration described in this specification employs one server and one client only. However, the configuration can also be applied to an actual CSS (Client-Server System) environment in which a plurality of servers and clients exist.

Each block in a server 100 and in a client 200 is a functional module. A communication control unit 110 includes a network operation system, and a work-flow managing unit 120 controls the transfer of images stored in a database and other data in accordance with conditions set in advance.

A code-information database 130 stores control information of image data and code data appended to images. An image database 140 stores and controls images of documents and the like as data. A recovery-state managing unit 150 extracts information from the work-flow managing unit 120 at a time of image data recovery, which information indicates whether or not data representing an ongoing process of a job are preserved. The recovery-state managing unit 150 is also used for identifying which data are to be retrieved.

The recovery-state managing unit 150 comprises a status-information judging unit 151, a read-file judging unit 152, a flow-state-matching control unit 153, a local-file-accessibility verifying unit 154, and a file-transfer managing unit 155. The status-information judging unit 151 reads out information from a status column of a work-flow control table and determines whether it is necessary to go upstream to the previous stage. The read-file judging unit 152 determines an actual file in accordance with the determination made by the status-information judging unit 151 as to which file information should be read. The flow-state-matching control unit 153 requests the updating of the work-flow control information if necessary (for example, in the case of a trace-back going upstream to the previous stage in order to establish the matching between the file updating and the work flow). The local-file-accessibility verifying unit 152 makes a judgment a s to whether a local file can be accessed by verification in the case of a local file used as a file to be read at recovery time. The file-transfer managing unit 155 specifies a transfer destination of a file used as a transfer origin which may be a local file or a relevant file in the server.

Storage devices 125, 135, and 145 store data of the work-flow managing unit 120 and the associated databases 130 and 140. It should be noted that the storage devices 125, 135, and 145 are merely separated logically from each other. In actuality, they may be built into a single physical unit without creating any hindrance.

The storage device 125 serves as a work-flow information storing unit in which the work-flow control table cited above is stored. The work-flow control table contains information necessary to make a judgment at recovery time, which information indicates the present status of each piece of data including work-flow control information such as the position of data and a user name to receive transferred data in the work flow. The storage device 135 is used for storing code information such as search information and code data. The storage device 145 is an image data storing unit for storing image data, code information which flows along the work flow throughout the system.

In the client, on the other hand, a network control unit 210 includes an operation system much like the communication control unit 110 employed in the server. An application module 220 of the work-flow client requests and displays relevant image data in accordance with the work flow. A document processing application module 230 executes a variety of office-automation processings for displayed image data. In addition, a local file 235 for temporarily holding data transferred from the server is connected to the document processing application module 230. Data stored in the local file 235 include copied as well as created data. Accordingly, in a process of partially updating data in the client, the updating of one side (i.e., incoming or unedited data) of the local file 235 is always reflected on the other side.

An example will be advanced for explaining the method of utilizing the present system. In this example, work is done as follows. A document is input as image data and stored in the image data base 140. Now, while the image data are being circulated through the work flow, each user adds code information such as a comment to the image data.

Image data input from a scanner or other types of input equipment are recorded in the image-data storage device 145 under the control of the image data base 140. At that time, control information of the image data is recorded in the code-information storing device 135 under the control of the code-information data base 130.

A case in which a failure occurs in the system in the course of flow processing, causing some image data to be lost, is described in the following.

The explanation begins with an example in which no image data need to be retrieved by the client when the failure occurs despite the fact that the flow processing is under way, and data resulting from the completion of the previous stage are recorded also in a temporary file of the server.

In accordance with the next data access, the code-information database is searched for the control information of the data in question. At that time, if the system ascertains that requested data are lost, the work-flow managing unit 120 further searches the work-flow control table for the requested data. As a result, the system can ascertain that the requested data have been backed up in the server at the completion of the previous stage. Here, by reading out the backup data, the flow processing can be resumed without hindrance. It should be noted that, in this case, since positioning in the work flow and the like have the same status as the original data, changes and corrections are not necessary.

Next, it is assumed that a failure occurs in a certain client in the course of processing which has already started. In this case, data being processed, which data are temporarily stored in the server or the client, exist along with result data output from the previous stage and stored in the server by a copy operation. In this case, the fact that the data in the process of being updated exist is known from the control-information database, and results retrieved from the control-information database are used to read out the data from the server or client so as to allow the processing to be resumed. By newly storing processing results in the database of the server after the completion of the processing, the amount of data loss due to the generated failure can be reduced to a minimum.

If the fact that the data have been updated in the client is confirmed by the flow control information, the data that are temporarily stored in the client or server are used. If the processing has not begun yet, or if the status information at the end of the previous stage is preserved as it is, the backup data in the server are read out.

In order to implement these operations, a means for recording pieces of information on the present position of each document and the status at the present position, in addition to the traditional items stored in the databases used in the management of the work flow, is provided along with an area for recording information indicating whether or not data in the process of being updated are recorded in the client. The information on the present position indicates a location on the work flow at which the document is located at the present time, whereas the information on the status indicates the state of the update, such as 'completed', 'not started', or 'under way' (which signifies that the update process has been started but not completed yet).

Examples of these pieces of information are shown in FIG. 2. The pieces of information shown in the figure are obtained by extracting only the portion relevant to data discovery, in accordance with the present invention, from pieces of data stored in the work-flow managing unit. Some of the pieces of information may not be included in the widely known pieces of data required as control information in the ordinary work-flow system. All documents already put in the work flow are described in a control table shown in FIG. 2 and, as the work flow is completed, the documents are deleted from the control table.

In FIG. 2, column 310 contains names of documents which are in the work flow at the present time. Each entry in a user-in-charge column 320 is used to indicate which user a document is currently assigned to. Here, as will be described later, a document finishing the work flow is deleted from the control table in a periodic delete operation or under other conditions. The user of a document completing the work flow is replaced by 'Fin' in the user-in-charge column 320 to indicate that there is no user in charge of processing, until the document is deleted from the control table. Each entry in a previous-stage-user-in-charge column 330 is used to indicate the name of a user in charge of processing a document on the line of the control table at the previous stage. The result of the updating carried out by the user in charge of processing at the previous stage is a final state of the data being processed, until the user in charge of processing at the following stage makes an access to the document.

In addition, if the current stage is a stage at which a document is put in the work flow, the line in the previous-stage-user-in-charge column 330 for the document is filled with a blank.

Each entry of a status column 340 is used for describing the status of the updating of a document on the line of the control table carried out by the user in charge of processing at the current stage. In this embodiment, for the sake of brevity, three characters are used: N, P, and F. The N character indicates that, at the present time, the document is not being accessed, whereas the P character indicates that the document is currently being processed. The F character, on the other hand, denotes a state waiting for deletion of the line after completion of all stages in the work flow as described earlier. In the actual system, however, other identification codes can be further used for describing the process (the status of the file) with as much precision as is desired.

In a process to recover data, the status-information judging unit 151 employed in a recovery-state managing unit 150 reads out information from the status column 340, judging whether it is necessary to go upstream to the previous stage. The status-information judging unit 151 then selects proper backup data.

Each entry in an attribute entry column 350 describes the path name of a file for recording a state closest to that of a document on the line of the control table. Thus, in the case of document data not accessed by the user in charge of processing, the entry of this column 350 is filled with the path name of the file for recording data obtained at the end of the processing carried out by the user in charge of processing at the previous stage or results output at the previous stage. In addition, when data are temporarily stored in the server in the course of data processing carried out by the users, the entry on this column 350 is updated. That is, the entry of this column is filled with the path name of a file in the server for temporarily recording the data.

Each entry in a previous-stage-attribute column 355 describes the path name of a file for recording copied data representing the final state output by the user in charge of processing at the previous stage. The contents of this column entry do not change until the next user in charge of processing completes its processing, outputs processing results, and finishes copying the data.

Accordingly, by holding data of the previous-stage-attribute column 355, the user can obtain processing results of at least one stage earlier. As a result, whatever failures have occurred, it is not necessary for the users except the user who accessed the data in question to review the data for recovery purposes at that point of time, and there is no need for reprocessing the document in question by going upstream to a previous stage.

Figure 3:
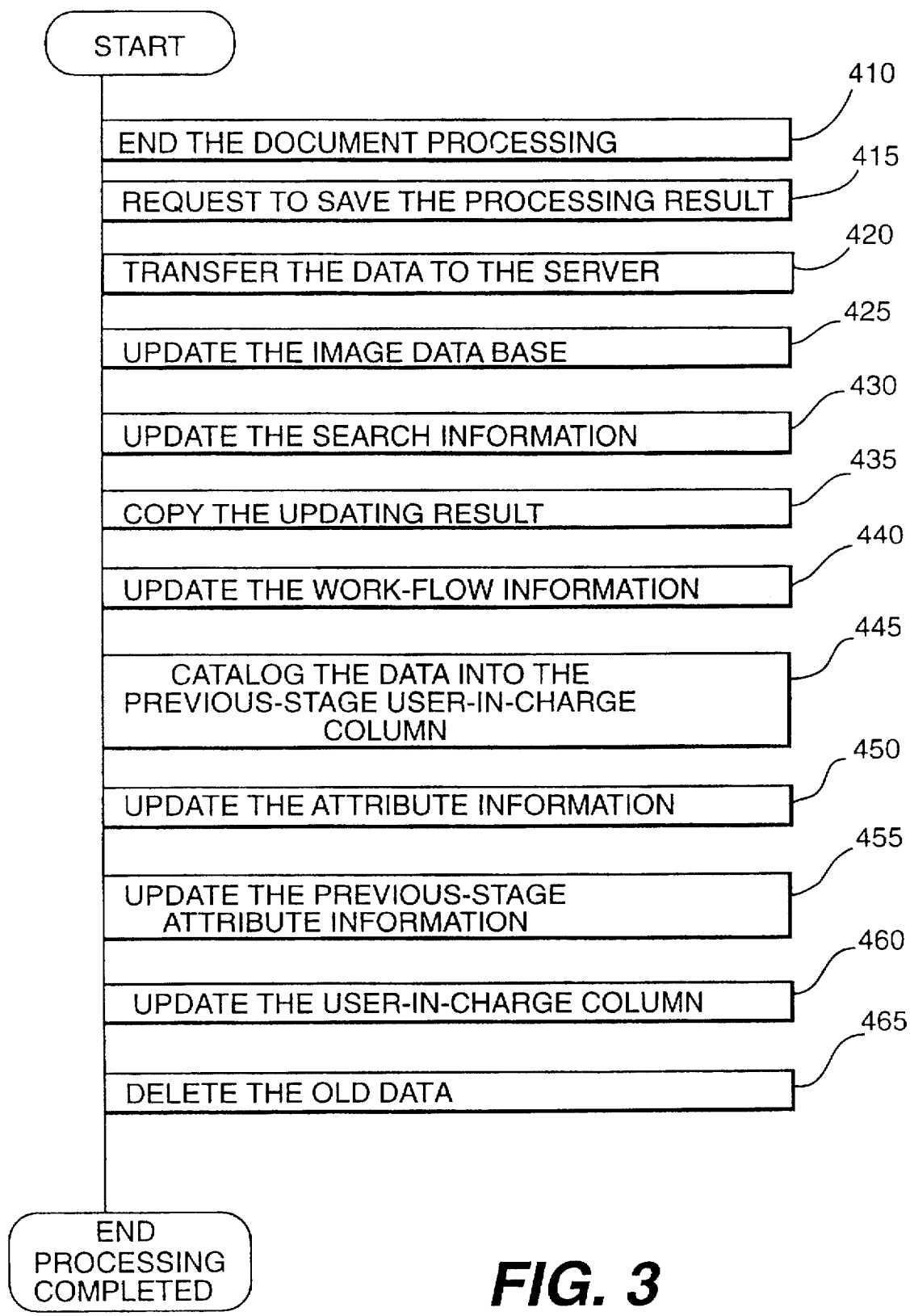
FIG. 3 is a diagram used for explaining a procedure for making a backup of data in a server at the end of each stage in a work flow.

A procedure for creating a backup of data in the execution of the data management in accordance with the present system is described by referring to FIG. 3 as follows. FIG. 3 shows a flow of an updating procedure followed on the database side when a user in charge of processing processes a document sent in accordance with the work flow and returns results of the processing to the server. At a step 410, the user in charge of processing completes the processing and, at a step 415, the user requests the server-client system to store results of the processing in the data server.

At a step 420, the data resulting from the processing described above is transmitted from the client to the server through the network. First of all, at a step 425, the data are recorded in the image-data storage device 145 under the control of the image database 140. Next, at a step 430, the code-information database 130 updates the search information of the data stored in the code-information storage device 135. As a result, the image data recorded this time can be searched for as an element of the database if requested later on. Then, at a step 435, these data are copied to be stored at a different location of the storage under a different name.

At the next stage, at a step 440, the control information of the work flow is updated following the recording of the updated data. First of all, at a step 445, after the control information has been updated at a stage in an ordinary work flow, the data are cataloged as a result of the updating operation carried out by the user in charge of processing, and the status information and the name of the user at the previous stage are also updated. Then, the attribute information and the attribute information of the previous stage are updated at steps 450 and 455, respectively. The path name of the copied data described above is recorded in the attribute information of the previous stage. By describing the pieces of attribute information, not only can a retrieval of the data stored in the file be made from the work flow later on, the path name of which is prescribed by the attribute information, but it is also possible to retrieve copied data when processing results obtained at the previous stage are required.

After these steps have been completed, the procedure flow continues to a step 460 to update the name of the user in charge of processing. The procedure flow further continues to a step 465, the final stage, at which data obtained as a result output by the stage prior to the previous stage, which data have been temporarily stored as a result output by the previous stage, or a copy thereof is deleted. As a result, in the present system, only the processing result of the previous stage, a stage prior to the update processing currently being carried out, is always recorded in the form of duplicated data.

Figure 4:
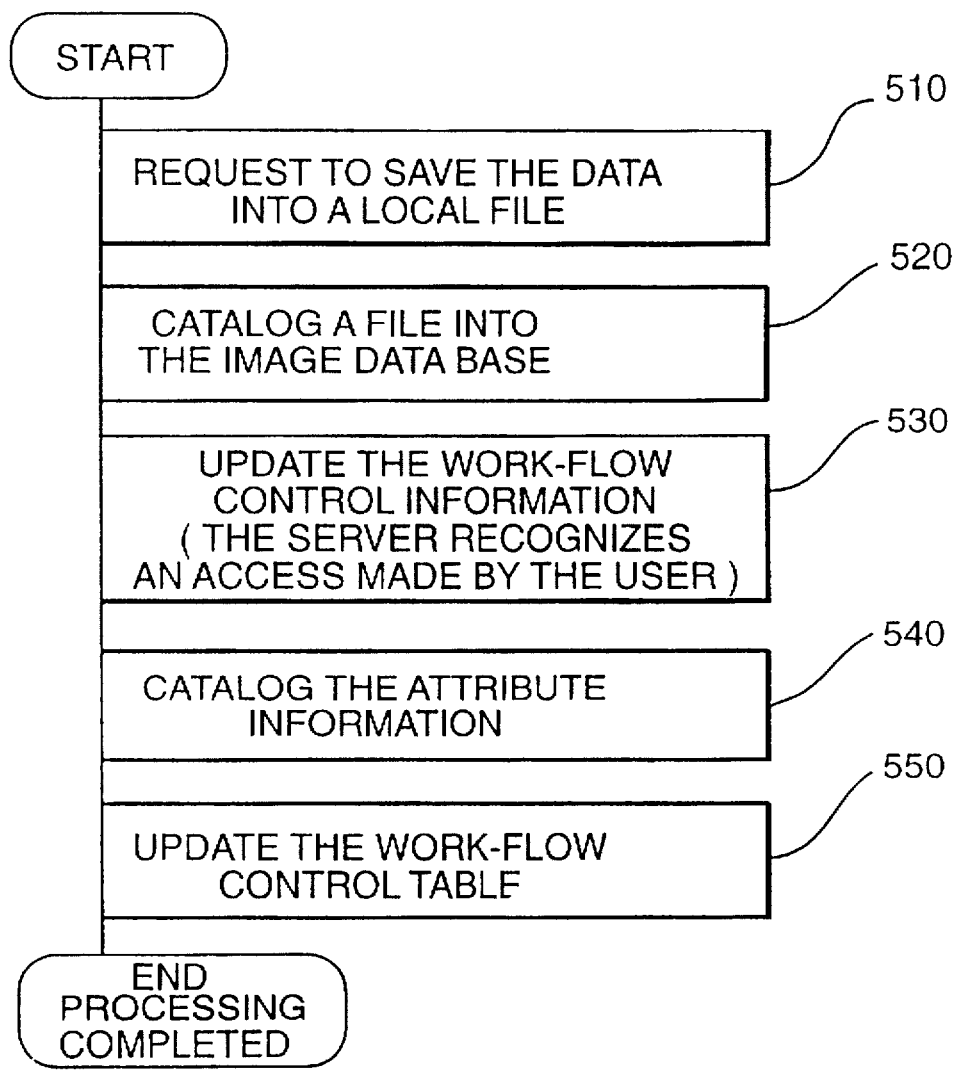
FIG. 4 is a diagram used for explaining a procedure for making a backup of data being processed by a client.

A procedure for locally recording data being updated in the course of processing a document at a client is explained by referring to FIG. 4 as follows. Data being processed in the memory of the client are recorded in a local file 235 using the ordinary method at a step 510. At a step 520, the client makes an access to the server through the network, cataloging the file as image data in the server. The procedure flow then continues to a step 530 to catalog the data as being the most recent data, in the work-flow control information. At a step 540, the path name of the local file is cataloged as attribute information in the work-flow control table.

As a result, the local file of the client is cataloged as backup information of the most recent data being processed with a copied file specified as it is. The copied file contains a copy of the data recorded in the server as a result produced by the previous stage. The procedure flow then continues to a step 550 to update the contents of the user-in-charge and status columns of the work-flow control table. As a result, at this point of time, when a new user in charge of processing accesses data in the work-flow control table, the user will be aware that the contents of the table have been updated.

In order to clarify the existence of the most recent file in the local file 235, an identifier for that purpose may be recorded in the work-flow control table.

By executing the procedure explained thus far, data and a copy thereof are recorded in the server, allowing the local file 235 recorded in the client 200 to be handled as a work-flow control object.

When data are cataloged in the local file 235 of the client 200, a copy of the data is also cataloged in the server as well, allowing the attribute data itself and a copy thereof to be preserved simultaneously. In this case, a variety of control techniques exist. According to one typical control technique, two columns for cataloging attribute information are provided in the work-flow control table, allowing data being processed to be preserved as a backup file.

Figure 5:
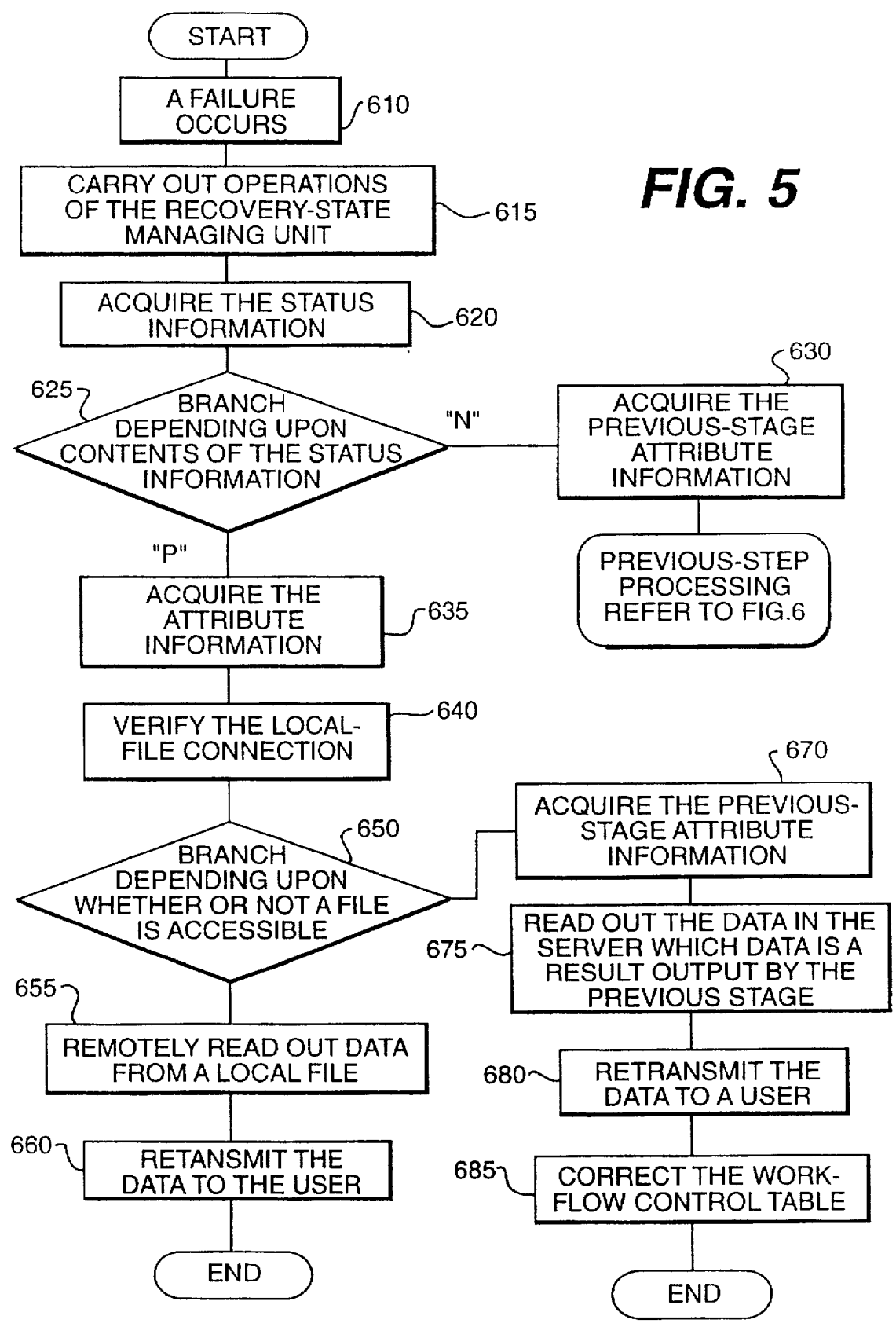
FIG. 5 is a diagram used for explaining a procedure for recovering data in the event of a failure.

Next, a procedure for recovering data in the event of a failure occurring in a system is explained by referring to FIG. 5.

Upon a failure in the system at a step 610, the recovery-state managing unit of the system denoted by reference numeral 150 in FIG. 1 operates (step 615), as data necessary in the work flow cannot be obtained normally. At a step 620, the recovery-state managing unit 150 makes an access to the work-flow control table 300 shown in FIG. 2, acquiring status information. The procedure flow then proceeds to a step 625 at which the status-information judging unit 151 examines the status information. If the status-information judging unit 151 finds that the status information is N, indicating that the document is not currently being accessed, the procedure flow proceeds to a step 625 to acquire information from the previous-stage-attribute column 355, because a result output by the previous stage will be used as data in the recovery.

On the other hand, if the status-information judging unit 151 finds that the status information is P, indicating that the document is currently being processed, the procedure flow continues to a step 630 to acquire a path name from the attribute-information column 350. At the same time, the name of the user in charge of processing, to whom the data are to be transmitted, is also acquired (step 635). In this case, the procedure flow continues to a step 640 to verify whether the local file 235 is in a connected state by using the network in the first place. This is because it is necessary to retrieve data from the local file 235. Normally, a network operation system has a function for monitoring the state of a client connected thereto. Thus, the verification of the accessibility state of the local file can be carried out by means of an already known method.

The procedure flow then continues to a step 650 at which the local-file-accessibility verifying unit 154 determines whether the connected local file is accessible. If the accessibility state of the local file is verified, the procedure flow continues to a step 655 at which the read-file judging unit 152 reads out data from the local file found through the path-name attribute thereof. The procedure flow then proceeds to a step 660 at which the file-transfer managing unit 155, which determines the transfer destination of the file at the transfer origin, retransmits the data to a user requesting the recovery. In this way, the loss due to lost data can be suppressed to a minimum.

If the accessibility state of the local file cannot be verified at the step 650 due to the fact that the file is not connected or not formatted, on the other hand, the procedure flow proceeds to a step 670 to acquire information on the previous-stage attribute. The procedure flow then continues to a step 675 to read out a copy of data resulting from the processing at the previous stage, from a file (which exists in the server) indicated by the path name in the previous-stage attribute information. The procedure flow then proceeds to a step 680 to retransmit the data to a user requesting the recovery. In this case, since the status in the work flow changes, the flow-state-matching control unit 153 requests the updating of the work-flow control information in order to correct the work-flow control table so as to reflect a new state, at a step 685.

According to this procedure, data on the work flow and being updated by a user are backed up in a local file, allowing the work flow to be resumed by means of the control of the work flow in spite of the fact that the local file is a physical file.

Figure 6:
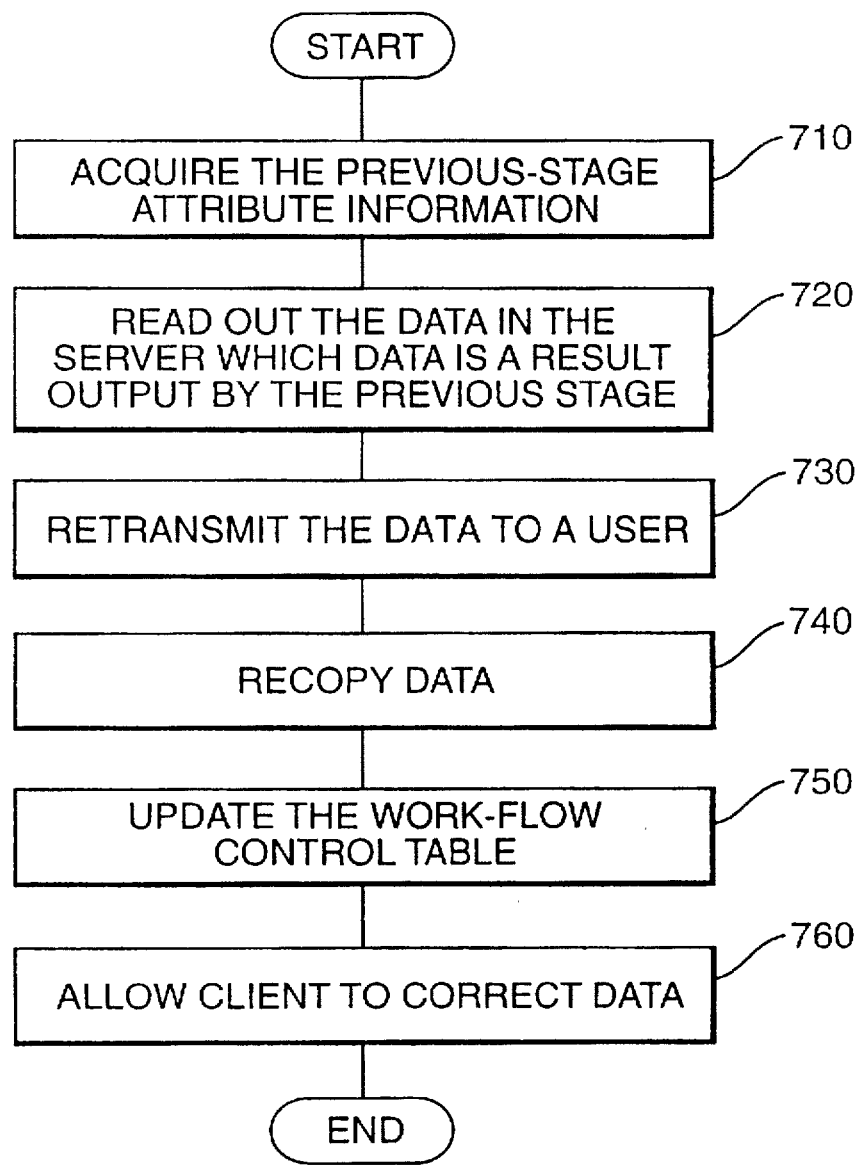
FIG. 6 is a diagram used for explaining a procedure for recovering data in the event of a failure to a state at the end of processing carried out at the previous stage in the work flow.

Next, a case in which data are recovered, by going upstream to a point of time when data are produced by a user in charge of processing at the previous stage, is explained by referring to FIG. 6. The tracing of such a process applies to a case in which a new user in charge of processing has not made an access yet. In addition, also in the case of a contradiction existing in the work-flow control information, the data can be used for preserving data matching.

If the status-information judging unit 151 finds that the status information is N, indicating that the document is not currently being accessed, information is acquired from the previous-stage-attribute column 355 at a step 710. The procedure flow then proceeds to a step 720 to read but data from a local file indicated by the path name in the previous-stage attribute information. The procedure flow then continues to a step 730 to retransmit the data to a user requesting the recovery. In this case, since the new user in charge of processing has not made an access yet, it is not necessary to make any change to the work-flow control information In addition, when recovery is carried out by using copied data in this way, before the user modifies the data, the data are recopied at a step 740, making it necessary to control both the data and the copy. The flow then proceeds to a step 750 to update the information in the work-flow control table, which should be modified due to the recopying of the data. As step 750 is completed, the flow proceeds to a step 760 to allow the client to correct the data.

As described above, a recovery-state managing unit is provided for making a selection of a file to be transferred, which selection is based on the state of data to be used in the recovery and the accessibility state of the file identified through the network. In other words, the recovery-state managing unit determines a file to be transferred. The determination of the file is based on main items of the work-flow control table shown in FIG. 2 and on the state of the network at that point of time (that is, the state of the accessible file).

Typical operations carried out by the recovery-state managing unit under various conditions are shown in FIG. 7. In the case shown in the figure, an access to the local file is made only when the most recent user has already been executing an operation to update the file and the data being updated have been temporarily saved. When the actual data are read in, the local file must be in an accessible state.

It should be noted that, as described above, the user himself or herself can make a recovery judgment without resorting to the automatic recovery judgment made by the recovery-state managing unit 150. In this case, the recovery judgment can also be implemented as follows. A file relevant to the data or a backup file created for the data at a point of time in the past is revealed to the user, allowing the user to specify a file to be read out in the recovery.

A procedure for creating a backup of data is shown in FIG. 3. According to the procedure, when the user finishes the updating of data transmitted from the server, a result of the updating is recorded in the image-data storage device 145 employed in the server 100 at two separate locations with different file names. One of the files is to be left unupdated even if the other is updated. At the end of the processing carried out by the user, the unupdated file is deleted.

As described above, according to the present invention, image data in a the process of a work flow of a work-flow system can be protected. As a result, even if a data update carried out by the user is suspended or a failure occurs, data at time of suspension or failure can be recovered. Additionally, a backup file can be created without the necessity of going off the work flow, allowing the circulation along the work flow to be resumed.

Various modifications to the features and embodiments described above will become apparent to the person of ordinary skill in the art to which the subject matter of the invention pertains. All such modifications that basically rely on the teachings through which the invention has advanced the state of the art are properly considered within the spirit and scope of the invention.

We claim:

1. An image-data managing apparatus for a work-flow system that handles documents that flow among a plurality of clients in a predetermined order of said clients, in which image data of the documents are transmitted from a server through a local area network to the plurality of clients sequentially, wherein:

each of said clients includes temporary storage means for temporarily storing data being updated, data awaiting update, and updated data;

said server comprises an image database, an image-data storing unit, a work-flow managing unit for holding control information of said image data of the documents and for controlling transfers of said image data and collateral data, and a recovery-state managing unit;

when a fault occurs in said work-flow system and recovery of said image data is requested by said server, said recovery-state managing unit extracts said control information from said work-flow managing unit, the control information indicating whether or not image data without fault are preserved in said temporary storage means of one of said clients or in said image-data storing unit in the course of update processing, thereby identifying image data to be retrieved;

when processing at said client to update image data transferred from said server is finished, said server records an updating result at two locations in said image-data storing unit, and updates said control information, including status information which indicates a processing state of said image data, and attribute information which indicates a path name of a file for storing recorded image data; and said server records image data being updated in said temporary storage means in said client, and catalogs a path name of a file of said temporary storage means in said attribute information, making most recent image data being processed accessible.

2. An image-data managing apparatus for a work-flow system that handles documents that flow among a plurality of clients in a predetermined order of said clients, in which image data of the documents are transmitted from a server through a local area network to the plurality of clients sequentially, wherein:

each of said clients includes temporary storage means for temporarily storing data being updated, data awaiting update, and updated data;

said server includes at least an image database, an image-data storing unit, a work-flow managing unit for holding control information of said image data of the documents and for controlling transfers of said image data and collateral data, and a recovery-state managing unit;

when a fault occurs in said work-flow system and recovery of said image data is requested by said server, said recovery-state managing unit extracts said control information from said work-flow managing unit, the control information indicating whether or not image data without fault are preserved in said temporary storage means of one of said clients or in said image-data storing unit in the course of update processing, thereby identifying image data to be retrieved; and said recovery-state managing unit decides, based on said control information in the event of said fault, whether data are to be read out from either a data file in said server for storing data copied at the end of processing by one of said clients at a previous stage or a data file in a current one of said clients for temporarily saving data being processed by said current client.

3. An image-data managing apparatus according to claim 2, wherein:

said recovery-state managing unit includes a status-information judging unit, a read-file judging unit, and a local-file-accessibility verifying unit;

said status-information judging unit acquires status information indicating a processing state of image data in order to make a decision as to whether it is necessary to go upstream to a file for storing copied data for one of said clients at a previous stage;

said read-file judging unit determines the name of a file to be read from attribute information, including a path name of said file for storing image data in accordance with said decision by said status-information judging unit; and said local-file-accessibility verifying unit determines whether said file to be read is accessible if said file to be read is held in said temporary storage means of said client.

4. An image-data managing program, stored in a computer-readable storage medium, for a work-flow system that handles documents that flow among a plurality of clients in a predetermined order of said clients, in which image data of the documents are transmitted from a server through a local area network to the plurality of clients sequentially; the server including an image database, an image-data storing unit, a work-flow managing unit for holding control information of said image data of the documents and for controlling transfers of said image data and collateral data, and a recovery-state managing unit; each of said clients including temporary storage means for temporarily storing data being updated, data awaiting update, and updated data;

the program comprising the following steps:

when a fault occurs in said work-flow system and recovery of said image data is requested, instructing said recovery-state managing unit to extract said control information from said work-flow managing unit, which control information indicates whether or not image data are preserved in said temporary storage means or said image-data storing unit in the course of update processing, to thereby identify image data to be retrieved;

when processing at said client to update image data transferred from said server is finished, recording a result of said update at two locations in said image-data storing unit, and updating said control information, including status information which indicates a processing state of said image data, and attribute information which indicates a path name of a file for storing recorded image data; and recording image data being updated in said temporary storage means in said client, and cataloging a path name of a file of said temporary storage means in said attribute information, making most recent image data being processed accessible.

* * * * *